(12) United States Patent
Zhou et al.

(10) Patent No.: US 9,332,546 B2
(45) Date of Patent: May 3, 2016

(54) RADIO RESOURCE OPTIMIZING METHOD, APPARATUS, AND SYSTEM

(71) Applicant: Huawei Technologies Co., Ltd., Shenzhen, Guangdong (CN)

(72) Inventors: Wei Zhou, Shenzhen (CN); Hongding Zhang, Guangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 152 days.

(21) Appl. No.: 14/141,743

(22) Filed: Dec. 27, 2013

(65) Prior Publication Data

US 2014/0112318 A1   Apr. 24, 2014

(30) Foreign Application Priority Data

Nov. 25, 2011   (CN) .......................... 2011 1 0380497

(51) Int. Cl.
*H04W 72/04* (2009.01)
(52) U.S. Cl.
CPC .......... *H04W 72/0453* (2013.01); *H04W 72/04* (2013.01); *H04W 72/0446* (2013.01); *H04W 72/0433* (2013.01)
(58) Field of Classification Search
CPC ................................................ H04W 72/0453
See application file for complete search history.

(56) References Cited

U.S. PATENT DOCUMENTS

| 5,384,767 A | 1/1995 | Moorwood et al. |
| 5,941,950 A | 8/1999 | Hwang et al. |
| 2008/0232288 A1* | 9/2008 | Venkatachalam et al. .... 370/311 |
| 2009/0197589 A1* | 8/2009 | Kitazoe ............... H04W 76/045 455/422.1 |
| 2010/0054231 A1 | 3/2010 | Dolganow et al. |
| 2010/0172306 A1 | 7/2010 | Gill et al. |
| 2011/0080886 A1 | 4/2011 | Chandrachood et al. |

(Continued)

FOREIGN PATENT DOCUMENTS

| CN | 102045393 A | 5/2011 |
| CN | 102123511 A | 7/2011 |

(Continued)

OTHER PUBLICATIONS

"Identifying change in behaviour of mobile data applications," 3GPP TSG-SA WG1 Meeting #54, Xi'An, China, S1-111143, $3^{rd}$ Generation Partnership Project, Valbonne, France (May 9-13, 2011).

*Primary Examiner* — Jason Mattis
(74) *Attorney, Agent, or Firm* — Leydig, Voit & Mayer, Ltd.

(57) ABSTRACT

Embodiments of the present invention provide a radio resource optimizing method, apparatus, and system. The method includes: performing DPI on received network data, so as to identify a protocol type of the network data; if the network data is a first kind of data stream, identifying a heartbeat in the first kind of data stream, and obtaining heartbeat information of the heartbeat; when the heartbeat interval period of the heartbeat information is greater than a radio resource pre-allocated time slice, determining a radio resource bandwidth allocation parameter according to the heartbeat bandwidth requirement of the heartbeat information; and sending a radio resource allocation parameter including the radio resource bandwidth allocation parameter. In this way, the radio resource allocation parameter is dynamically set when an application runs in the background, thereby improving the utilization rate of an air interface bandwidth and time of a radio base station.

18 Claims, 7 Drawing Sheets

(56) References Cited

U.S. PATENT DOCUMENTS

| | | | |
|---|---|---|---|
| 2012/0131663 A1* | 5/2012 | Anchan | H04L 29/12471 726/13 |
| 2012/0170484 A1 | 7/2012 | Proctor, Jr. | |
| 2012/0188928 A1* | 7/2012 | Wang et al. | 370/311 |
| 2013/0201962 A1 | 8/2013 | Proctor, Jr. | |
| 2013/0311654 A1 | 11/2013 | Lei | |
| 2014/0051485 A1* | 2/2014 | Wang et al. | 455/574 |
| 2014/0226562 A1* | 8/2014 | Shah et al. | 370/328 |

FOREIGN PATENT DOCUMENTS

| | | |
|---|---|---|
| CN | 102177697 A | 9/2011 |
| EP | 2487872 A1 | 8/2012 |
| JP | H04335731 A | 11/1992 |
| JP | 2010028832 A | 2/2010 |
| JP | 2010506459 A | 2/2010 |
| JP | 2010283848 A | 12/2010 |
| JP | 2011049891 A | 3/2011 |
| RU | 2171491 C2 | 7/2001 |
| WO | WO 2011116718 A2 | 9/2011 |

* cited by examiner

RADIO RESOURCE OPTIMIZING METHOD, APPARATUS, AND SYSTEM

CROSS-REFERENCE TO RELATED APPLICATIONS

This application is a continuation of International Patent Application No. PCT/CN2012/072884, filed on Mar. 23, 2012, which claims priority to Chinese Patent Application No. 201110380497.0 filed on Nov. 25, 2011, both of which are hereby incorporated by reference in their entireties.

TECHNICAL FIELD

The present invention relates to the field of radio communications, and in particular, to a radio resource optimizing method, apparatus, and system.

BACKGROUND

With the continuous development of a general packet radio service (General Packet Radio Service, GPRS) and a third generation (3th Generation, 3G) service, user equipments (User Equipment, UE), such as smart phones and netbooks based on data cards, capable of performing internet services are widely used. Corresponding Internet services such as Instant Messenger (IM), email, and social network service (Social Network Service, SNS) increase explosively. When those Internet applications run services in the background for a long time, for the purpose of keeping a service alive or push a service, signaling packets are sent regularly or irregularly. These signaling packets feature an extremely short sending duration (about 0.01 s to 0.1 s) and a relatively short packet length (about 100 to 200 bytes).

In current application practices, a UE automatically and regularly enters a standby state due to an electricity saving requirement of the UE, and in this case, a radio access network (Radio Access Network, RAN) adjusts a state to FACH or IDLE, and once it is inspected that the user equipment sends data, switches to a PCH state, and pre-allocates a resource slice duration with a fixed time (about 10 s) and a channel with a fixed bandwidth (64 K). In this way, when an Internet application such as the IM is in a background running stage, a low utilization rate of an air interface bandwidth and time of a radio base station is caused, which consumes a lot of unnecessary radio resources.

SUMMARY

Embodiments of the present invention provide a radio resource optimizing method, apparatus, and system, so as to improve the utilization rate of an air interface bandwidth and time of a radio base station when an application runs in the background for a long time, and avoid a waste of radio resources.

An embodiment of the present invention provides a radio resource optimizing method, where the method includes:

performing deep packet inspection on received network data, so as to identify a protocol type of the network data;

when it is determined, according to the protocol type, that the network data is a first kind of data stream, identifying a heartbeat in the first kind of data stream, and obtaining heartbeat information of the heartbeat, where the heartbeat information includes a heartbeat interval period and a heartbeat bandwidth requirement;

when the heartbeat interval period is greater than a radio resource pre-allocated time slice, determining a radio resource bandwidth allocation parameter according to the heartbeat bandwidth requirement; and sending a radio resource allocation parameter including the radio resource bandwidth allocation parameter.

An embodiment of the present invention further provides a radio resource optimizing apparatus, where the apparatus includes:

a protocol identification module, configured to perform deep packet inspection on received network data, so as to identify a protocol type of the network data;

a heartbeat identification module, configured to: when it is determined, according to the protocol type, that the network data is a first kind of data stream, identify a heartbeat in the first kind of data stream, and obtain heartbeat information of the heartbeat, where the heartbeat information includes a heartbeat interval period and a heartbeat bandwidth requirement;

a radio resource allocation parameter determination module, configured to: when the heartbeat interval period is greater than a radio resource pre-allocated time slice, determine a radio resource bandwidth allocation parameter according to the heartbeat bandwidth requirement; and a sending module, configured to send a radio resource allocation parameter including the radio resource bandwidth allocation parameter.

An embodiment of the present invention further provides a radio network controller, where the radio network controller includes: a data receiving apparatus, a service processing apparatus, a data sending apparatus, and so on. In addition, the radio network controller further includes the radio resource optimizing apparatus provided in the foregoing embodiment.

An embodiment of the present invention further provides a radio resource optimizing system, including a radio network controller and a radio base station, where:

the radio base station is configured to send network data from a user equipment to the radio network controller, receive a radio resource allocation parameter delivered by the radio network controller, and perform radio resource allocation; and the radio network controller is the radio network controller provided in the foregoing embodiment.

An embodiment of the present invention further provides another radio resource optimizing system, including a radio base station, a radio network controller, and a radio resource optimizing apparatus having a communication connection to the radio network controller, where:

the radio base station is configured to send network data from a user equipment to the radio network controller, receive a radio resource allocation parameter delivered by the radio network controller, and perform radio resource allocation;

the radio network controller is configured to receive the network data sent by the radio base station, send the network data or a mirror of the network data to the radio resource optimizing apparatus, and send the radio resource allocation parameter from the radio resource optimizing apparatus to the radio base station; and the radio resource optimizing apparatus is the radio resource optimizing apparatus provided in the foregoing embodiment.

It can be seen that, in the radio resource optimizing method, apparatus, and system that are provided in the embodiments of the present invention, deep packet inspection is performed on received network data, so as to identify a protocol type of the network data; when it is determined, according to the protocol type, that the network data is a first kind of data stream, a heartbeat is identified in the first kind of data stream, and heartbeat information of the heartbeat is obtained, where the heartbeat information includes a heartbeat interval period and a heartbeat bandwidth requirement; when the heartbeat interval period is greater than a radio resource pre-allocated time slice, a radio resource bandwidth allocation parameter is determined according to the heartbeat bandwidth requirement; and a radio resource allocation parameter including the radio resource bandwidth allocation parameter is sent. In this way, in the embodiments of the present invention, the radio resource allocation parameter is dynamically set when an application runs in the background for a long time, thereby improving the utilization rate of an air interface bandwidth and time of a radio base station when the application runs in the background, and avoiding a waste of radio resources.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The technical solutions in the embodiments of the present invention are clearly described in the following with reference to the accompanying drawings in the embodiments of the present invention. Apparently, the described embodiments are merely a part rather than all of the embodiments of the present invention. All other embodiments obtained by persons of ordinary skill in the art based on the embodiments in the present invention without any creative effort are covered in the protection scope of the present invention.

Figure 1A:
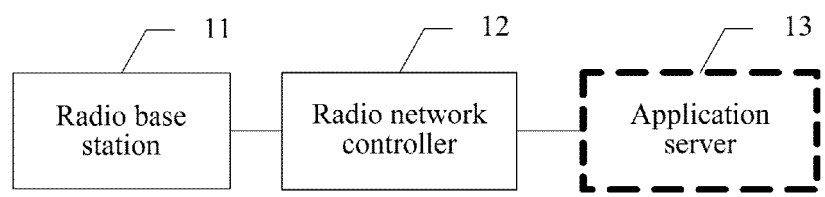
FIG. 1a is a schematic diagram of a logical structure of a radio network resource optimizing system according to an embodiment of the present invention.

Referring to FIG. 1a, FIG. 1a is a schematic diagram of a logical structure of a radio network resource optimizing system according to a first embodiment of the present invention. As shown in FIG. 1a, the radio network resource optimizing system according to this embodiment of the present invention may include:

a radio base station 11, configured to send network data from a user equipment to a radio network controller, receive a radio resource allocation parameter delivered by the radio network controller, and perform radio resource allocation; and the radio network controller 12, configured to perform deep packet inspection (Deep Packet Inspection, DPI) on the received network data, so as to identify a protocol type of the network data; when it is determined, according to the identified protocol type, that the network data is a first kind of data stream, identify a heartbeat (the heartbeat may be a single heartbeat packet or may also be multiple heartbeat packets) in the first kind of data stream, and obtain heartbeat information such as a heartbeat interval period and a heartbeat bandwidth requirement; when the heartbeat interval period is greater than a radio resource pre-allocated time slice, determine a radio resource bandwidth allocation parameter according to the heartbeat bandwidth requirement; and deliver the radio resource allocation parameter including the radio resource bandwidth allocation parameter to the radio base station 11.

In addition, as the time passes, a radio application may be upgraded or a new application is generated, so that a protocol of the application may be changed, and a heartbeat included in the application may also be changed accordingly, so it is required to correct protocol identification and heartbeat identification capabilities promptly and rapidly.

Further, the radio network controller 12 is further configured to: when the protocol type of the network data is not identified or when the heartbeat is not identified in the first kind of data stream, detect whether a heartbeat exists in the network data or the first kind of data stream; and if a heartbeat exists in the network data or the first kind of data stream, capture the heartbeat; classify the captured heartbeat; perform extraction of a heartbeat characteristic on heartbeats of the same kind by using a clustering algorithm, so as to obtain and feed back the heartbeat characteristic; and perform statistics collection of heartbeat information on the heartbeats of the same kind, so as to obtain and feed back the heartbeat information.

It should be understood that, as the time passes, an existing radio application may be upgraded (for example, QQ upgrading), and a user may also have another new application. Regardless of application upgrading or new application generation, a change of a protocol of the application may be caused, and a heartbeat included in the application may also be changed accordingly, so it is required to correct protocol identification and heartbeat identification capabilities promptly and rapidly.

It should be noted that, the heartbeat in this embodiment of the present invention refers to a data packet with an extremely short duration and a relatively short packet length. This kind of data packet often appears in a background running stage of the radio application and is used to keep a service alive or push a service, but this kind of data packet affects the utilization rate of a radio resource air interface. The first kind of data stream refers to a data stream that possibly includes a heartbeat and is determined according to the protocol type of the network data. For example, network data belonging to a QQ login protocol possibly includes a QQ login keepalive heartbeat, and in this case, the network data is determined as the first kind of data stream, that is, a data stream suspected to include a heartbeat, and heartbeat identification is performed on the network data.

Further, the radio network resource optimizing system according to this embodiment of the present invention may further include an application server 13, configured to send downlink network data to the radio network controller. A heartbeat generated when radio applications of some types, such as SNS and Email, run in the background generally belongs to an interactive heartbeat, that is, data packets in the heartbeat include not only an uplink data packet from a user but also a downlink data packet from an application server. Therefore, the radio network controller 12 in the radio network resource optimizing system according to this embodiment of the present invention may receive not only uplink network data transferred by the base station but also downlink network data from the application server, so as to identify the interactive heartbeat and take corresponding radio resource optimizing measures.

Figure 1B:
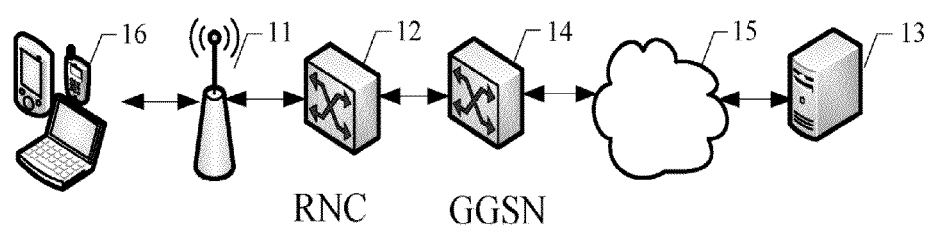
FIG. 1b is a schematic diagram of network deployment architecture of a radio network resource optimizing system according to an embodiment of the present invention.

Referring to FIG. 1*b*, FIG. 1*b* is a schematic diagram of network deployment architecture of a radio network resource optimizing system according to the first embodiment of the present invention. As shown in FIG. 1*b*, the radio network resource optimizing system according to this embodiment of the present invention may include: a radio network controller (Radio Network Controller, RNC) 12, where the RNC is specific implementation of the radio network controller 12 in FIG. 1*a* in the foregoing embodiment, and includes functions of the radio network controller 12 in FIG. 1*a* besides functional modules of a general RNC; a radio base station 11, corresponding to the radio base station 11 in FIG. 1*a* in the foregoing embodiment, and configured to send network data from a user equipment to the RNC 12, receive a radio resource allocation parameter delivered by the RNC 12, and perform radio resource allocation; and an application server 13, configured to send downlink network data to the RNC 12. In a process of heartbeat identification, the RNC 12 may not only receive uplink network data from the radio base station 11 but also receive downlink network data from the application server 13. For example, a heartbeat of an SNS application generally involves interaction of multiple data packets. When performing heartbeat identification on a data stream of the SNS application, the RNC 12 receives a user request data packet from the radio base station 11, then forwards the data packet to the application server, and then receives a server response data packet from the application server 13. The interaction process of these request-response data packets forms a heartbeat.

In an implementation manner, the radio resource optimizing system according to this embodiment of the present invention may further include: a user equipment UE 16, where the user equipment UE 16 may be a communication tool capable of performing radio communication, such as a mobile phone, a radio netbook, and a personal digital assistant (Personal Digital Assistant, PDA); a GGSN (Gateway GPRS Support Node, GGSN) 14, configured to support data filtering, routing, forwarding, and the like of a general packet radio service (General Packet Radio Service, GPRS); and a network 15, which may include a data transceiver device such as a router, a switch, and a user node, and is responsible for receiving, from the GGSN 14, uplink network data coming from the user equipment and forwarding the uplink network data to the application server 13, or receiving downlink network data from the application server 13 and forwarding the downlink network data to the GGSN 14.

In another implementation manner, the GGSN 14 may also be replaced by a packet data serving node (Packet Data Serving Node, PDSN) or a serving GPRS support node (Serving GPRS Support Node, SGSN). The application server 13 may also exist in the network 15 and become a node of the network 15.

Figure 2A:
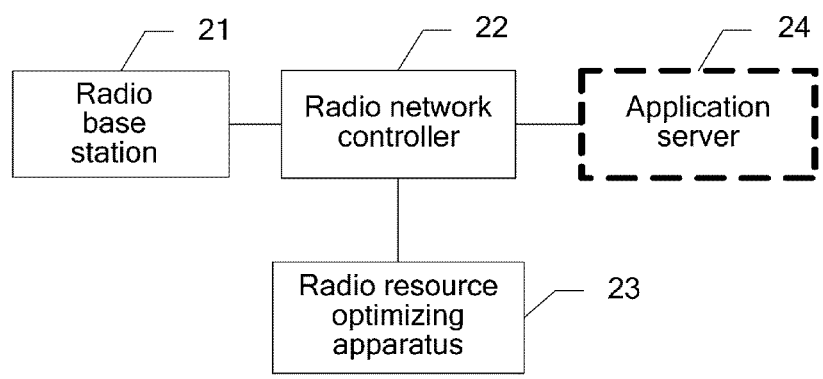
FIG. 2a is a schematic diagram of a logical structure of another radio network resource optimizing system according to an embodiment of the present invention.

Referring to FIG. 2*a*, FIG. 2*a* is a schematic structural diagram of another radio resource optimizing system according to a second embodiment of the present invention. As shown in FIG. 2*a*, the radio resource optimizing system according to this embodiment of the present invention may include:

a radio base station 21, configured to send network data from a user equipment to a radio network controller 22, receive a radio resource allocation parameter delivered by the radio network controller 22, and perform radio resource allocation;

the radio network controller 22, configured to receive the network data sent by the radio base station 21, send a mirror of the network data to a radio resource optimizing apparatus 23, and send the radio resource allocation parameter from the radio resource optimizing apparatus 23 to the radio base station 21; and the radio resource optimizing apparatus 23, configured to perform deep packet inspection on the received network data (here, the network data may be uplink network data that is sent by the radio network controller and comes from the radio base station or may also be downlink network data that is sent by the radio network controller and comes from the application server), so as to identify a protocol type of the network data; when it is determined, according to the identified protocol type, that the network data is a first kind of data stream, identify a heartbeat (the heartbeat may be a single heartbeat packet or may also be multiple heartbeat packets) in the first kind of data stream, and obtain heartbeat information such as a heartbeat interval period and a heartbeat bandwidth requirement; when the heartbeat interval period is greater than a radio resource pre-allocated time slice, determine a radio resource bandwidth allocation parameter according to the heartbeat bandwidth requirement; and send the radio resource allocation parameter including the radio resource bandwidth allocation parameter to the radio network controller 22.

It should be noted that, in the radio resource optimizing system according to the second embodiment of the present invention, the radio resource optimizing apparatus 23 acts as a separate device and externally is mounted to the radio network controller 22. The radio resource optimizing apparatus 23 has a communication connection to the radio network controller 22 and is configured to process a mirror of a network data packet sent by the radio network controller 22 and send the radio resource bandwidth allocation parameter to the radio network controller 22.

Further, the radio resource optimizing apparatus 23 is further configured to: when the protocol type of the network data is not identified or when the heartbeat is not identified in the first kind of data stream, detect whether a heartbeat exists in the network data or the first kind of data stream; if a heartbeat exists in the network data or the first kind of data stream, capture the heartbeat; classify the captured heartbeat; perform extraction of a heartbeat characteristic on heartbeats of the same kind by using a clustering algorithm, so as to obtain and feed back the heartbeat characteristic; and perform statistics collection of heartbeat information on the heartbeats of the same kind, so as to obtain and feed back the heartbeat information.

Further, the radio network resource optimizing system according to this embodiment of the present invention further includes an application server 24, which has the same role and function as the application server in the foregoing embodiment and therefore is not described here again.

Figure 2B:
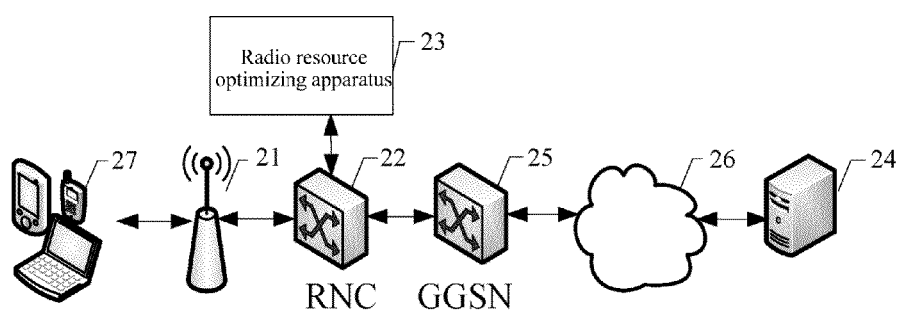
FIG. 2b is a schematic diagram of network deployment architecture of another radio network resource optimizing system according to an embodiment of the present invention.

Referring to FIG. 2b, FIG. 2b is a schematic diagram of network deployment architecture of another radio network resource optimizing system according to the second embodiment of the present invention. As shown in FIG. 2b, functions of a user equipment UE 27, a GGSN 25, a network 26, an application server 24, and a radio base station 21 are the same as functions of corresponding apparatuses in the schematic diagram of network deployment shown in FIG. 1b, which are not described here again. In addition to the foregoing apparatuses, the radio network resource optimizing system according to this embodiment of the present invention further includes: an RNC 22 and an external radio resource optimizing apparatus 23, which acts as a separate apparatus and only has a communication connection to the RNC 22. In this embodiment of the present invention, the RNC 22 may be understood as a general RNC but has a capability of communicating with the external radio resource optimizing apparatus 23. The RNC 22 is configured to receive network data sent by the radio base station 21 or the application server 24, and send a mirror of the network data to the radio resource optimizing apparatus 23. The radio resource optimizing apparatus 23 is configured to receive the mirror of the network data that is sent by the RNC 22; if the mirror of the network data is a data stream suspected to include a heartbeat, identify the heartbeat in the data stream; determine a radio resource allocation parameter according to heartbeat information of the heartbeat; and send a corresponding radio resource allocation parameter to the RNC 22, where the radio resource allocation parameter is then sent by the RNC 22 to the base station. In this embodiment, the external radio resource optimizing apparatus 23 optimizes radio resources and delivers an optimized radio resource allocation parameter.

Figure 3A:
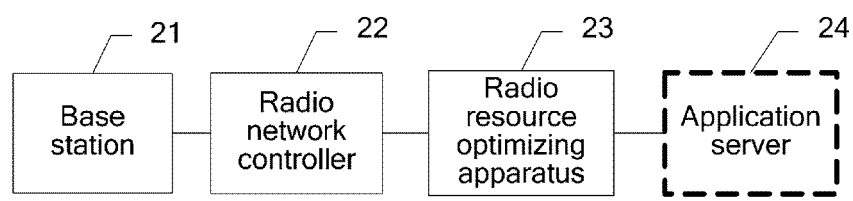
FIG. 3a is a schematic diagram of a logical structure of still another radio network resource optimizing system according to an embodiment of the present invention.

Referring to FIG. 3a, FIG. 3a is a schematic structural diagram of still another radio resource optimizing system according to a third embodiment of the present invention. As shown in FIG. 3a, the difference between the radio resource optimizing system according to the third embodiment of the present invention and the radio resource optimizing system according to the second embodiment of the present invention is that, a radio resource optimizing apparatus 23 is connected to a radio network controller 22 and other network devices in series. As shown in FIG. 3a, the radio resource optimizing apparatus 23 is connected between the radio network controller 22 and an application server 24 in series. The radio resource optimizing apparatus 23 is configured to receive uplink network data sent by the radio network controller 22 or downlink network data sent by the application server 24, and send a radio resource allocation parameter including a radio resource bandwidth allocation parameter to the radio network controller 22. It should be understood that, besides having the same functions as the radio resource optimizing apparatus 23 in the system in the second embodiment of the present invention, the radio resource optimizing apparatus 23 in the third embodiment of the present invention plays a role of conveying information between the radio network controller 22 and another network device, for example, the application server 24.

For functions of other component devices of the radio resource optimizing system according to the third embodiment of the present invention, reference is made to description in the second embodiment of the present invention, and details are not described here again.

Figure 3B:
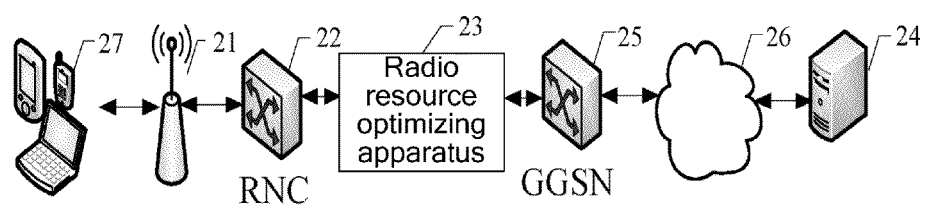
FIG. 3b is a schematic diagram of network deployment architecture of still another radio network resource optimizing system according to an embodiment of the present invention.

Referring to FIG. 3b, FIG. 3b is a schematic diagram of network deployment architecture of still another radio network resource optimizing system according to the third embodiment of the present invention. As shown in FIG. 3b, functions of a user equipment UE 27, a GGSN 25, a network 26, an application server 24, and a radio base station 21 are the same as functions of corresponding apparatuses in the schematic diagram of network deployment shown in FIG. 1b, which are not described here again. The difference from the network deployment architecture in the second embodiment of the present invention is that, in the third embodiment of the present invention, a radio resource optimizing apparatus 23 is connected in the network architecture in series, and specifically, connected between an RNC 22 and the GGSN 25 in series. The RNC 22 in this embodiment of the present invention may be understood as a general RNC but has a capability of communicating with the radio resource optimizing apparatus 23, and is configured to receive network data sent by the radio base station 21 and send the network data to the radio resource optimizing apparatus 23.

The radio resource optimizing apparatus 23 is configured to receive uplink network data sent by the RNC 22 or receive downlink network data sent by the GGSN 25; if the network data is a data stream suspected to include a heartbeat, identify the heartbeat in the data stream; determine a radio resource allocation parameter according to heartbeat information of the heartbeat; and send a corresponding radio resource allocation parameter to the RNC 22, where the radio resource allocation parameter is then sent by the RNC 22 to the base station 21. In this embodiment of the present invention, the radio resource optimizing apparatus 23 further plays a role of conveying information between the radio network controller 22 and another network device, for example, the application server 24, for example, conveying to the GGSN 25 the uplink network data sent by the RNC 22, or conveying to the RNC 22 the downlink network data sent by the GGSN 25.

In sum, in the radio resource optimizing system according to this embodiment of the present invention, deep packet inspection is performed on received network data, so as to identify a protocol type of the network data; when it is determined, according to the identified protocol type, that the network data is a first kind of data stream possibly including a heartbeat, heartbeat identification is performed on the network data, so as to obtain heartbeat information such as a heartbeat interval period and a heartbeat bandwidth requirement; when the heartbeat interval period is greater than a radio resource pre-allocated time slice, a radio resource bandwidth allocation parameter is determined according to the heartbeat bandwidth requirement; a radio resource allocation parameter including the radio resource bandwidth allocation parameter is sent; and a radio base station receives the radio resource allocation parameter and performs radio resource allocation. In this way, in this embodiment of the present invention, the radio resource allocation parameter is dynamically set when an application runs in the background for a long time, thereby improving the utilization rate of an air interface bandwidth and time of the radio base station when the application runs in the background, and avoiding a waste of radio resources.

Further, rapid correction of a protocol identification capability and a heartbeat identification capability can be further implemented by extracting and feeding back a heartbeat characteristic and heartbeat information, so as to support dynamic allocation of radio resources when more types of applications run in the background.

Furthermore, uplink data from the radio base station and downlink data from the application server are received, so that not only single packet based heartbeat identification but also multi-packet based heartbeat identification of a radio application can be provided, and multi-packet interaction based heartbeat identification of an application such as an SNS and email can be further provided. The radio resources are allocated dynamically according to a heartbeat characteristic, thereby avoiding a waste of the air interface bandwidth and time of the radio base station when the radio application runs in the background.

Figure 4A:
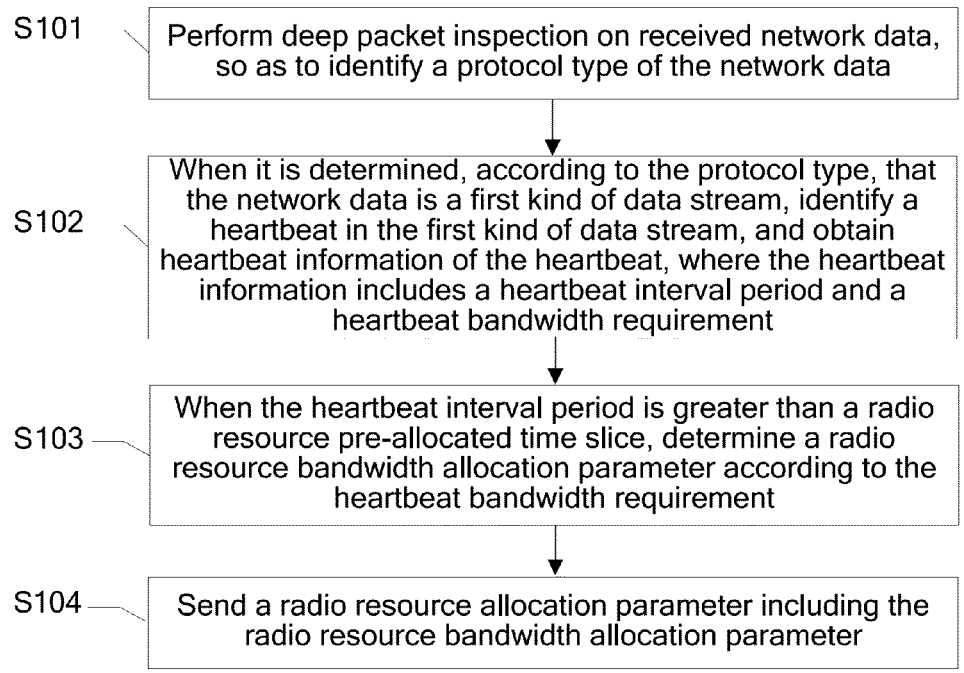
FIG. 4a is a schematic flow chart of a radio resource optimizing method according to an embodiment of the present invention.

Referring to FIG. 4a, FIG. 4a is a schematic flow chart of a radio resource optimizing method according to an embodiment of the present invention. It should be noted that, an execution subject of the radio resource optimizing method according to this embodiment of the present invention may include, but is not limited to, an RNC. As shown in FIG. 4a, the method according to this embodiment of the present invention may include the following steps:

Step S101: Perform deep packet inspection on received network data, so as to identify a protocol type of the network data. It should be noted that, here, the network data may be downlink data or may also be uplink data.

Specifically, the protocol type may be identified in a characteristic matching manner: First, the deep packet inspection is performed on the received network data, matching may be performed on a protocol characteristic of the inspected network data and a characteristic item in a pre-established protocol characteristics database, and when the matching succeeds, a protocol type identifier (for example, a protocol ID) corresponding to the characteristic item matched successfully is obtained.

Step S102: When it is determined, according to the protocol type, that the received network data is a first kind of data stream, identify a heartbeat in the first kind of data stream, and obtain heartbeat information of the heartbeat, where the heartbeat information includes a heartbeat interval period and a heartbeat bandwidth requirement.

Specifically, a pre-established protocol information set may be viewed according to the protocol type identifier obtained in step S101 to determine whether the network data corresponding to the protocol type possibly includes a heartbeat, and if the network data includes a heartbeat, the network data is the first kind of data stream.

In an implementation manner, matching is performed on a characteristic of a data packet in the first kind of data stream and a characteristic item in a heartbeat characteristics database, and when the matching succeeds, a heartbeat identifier (which may be a heartbeat ID) corresponding to the characteristic item matched successfully is obtained; and heartbeat information corresponding to the heartbeat identifier is obtained from a heartbeat information set according to the heartbeat identifier.

In another implementation manner, first, a data packet in the first kind of data stream is filtered according to a packet length condition (the packet length is less than a specific value), so as to obtain a data packet with a packet length less than the specific value in the first kind of data stream; then, characteristic matching is performed on a characteristic of the data packet with the packet length less than the specific value and a characteristic item in a heartbeat characteristics database, and when the matching succeeds, a heartbeat identifier corresponding to the characteristic item matched successfully is obtained; and heartbeat information corresponding to the heartbeat identifier is obtained from a heartbeat information set according to the heartbeat identifier.

It is worth mentioning that, the characteristic matching performed in step S102 may include sub-string characteristic matching, behavior characteristic matching, or algorithm characteristic matching. Persons of ordinary skill in the art easily know specific implementation manners of these technologies, which are not described here again.

It should be noted that, here, the first kind of data stream refers to a data stream that possibly includes a heartbeat and is determined according to the protocol type of the network data. For example, network data belonging to a QQ login protocol possibly includes a QQ login keepalive heartbeat, and in this case, the network data is determined as the first kind of data stream, and heartbeat identification is performed on the network data to identify the heartbeat of the network data.

In an implementation manner, the heartbeat interval period and the heartbeat bandwidth requirement may be obtained in step S102. For example, applications of an IM type are mostly borne in a proprietary protocol manner and mostly adopt UDP heartbeats. Generally, only one one-way data packet from a user equipment to an application server is used as a heartbeat borne by a single packet. The single packet based heartbeat has an extremely short duration, which is almost zero, so the duration may not be stored in the heartbeat information set.

In another implementation manner, the heartbeat interval period, the heartbeat bandwidth requirement and the heartbeat duration may be obtained in step S102. For example, applications such as the email or SNS are mostly borne over the HyperText Transfer Protocol (HyperText Transfer Protocol, HTTP), and a heartbeat is generally a group of data packets from the user equipment and the application server (for example, in a PING-PONG interaction manner), so a duration is relatively long and needs to be stored in the heartbeat information set. After being obtained, the duration is used as a reference for setting a radio resource time parameter.

Step S103: When the heartbeat interval period is greater than a radio resource pre-allocated time slice, determine a radio resource bandwidth allocation parameter according to the heartbeat bandwidth requirement.

Figure 4B:
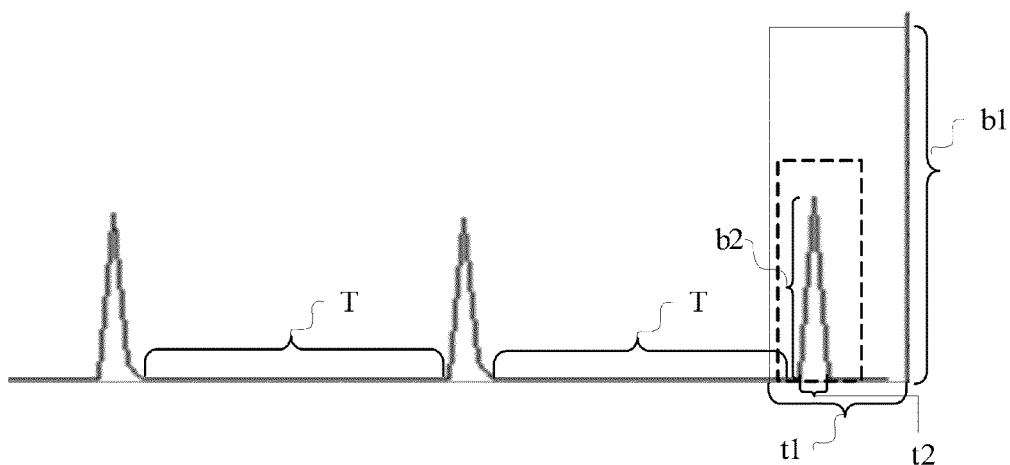
FIG. 4b is a schematic diagram of a traffic waveform of a data stream including a heartbeat according to an embodiment of the present invention.

When a radio application (such as the QQ of the IM type, SNS, or Email) runs in the background, for the purpose of keeping a service alive or push a service, a data packet with an extremely long interval period, an extremely short duration, and a low bandwidth requirement is often sent. In this embodiment of the present invention, the data packet is called a heartbeat. FIG. 4b is a schematic diagram of a traffic waveform of a data stream including the heartbeat data packet, where the horizontal coordinate represents time and the vertical coordinate represents bandwidths. In FIG. 4b, the raised waveform portion represents a heartbeat of a single data packet, and the smooth portion represents no data packet. As shown in FIG. 4b, a heartbeat interval period T is greater than a radio resource pre-allocated time slice t1 (t1 is about 10 s). For example, a QQ-like application runs in the background for a long time due to setting of a customer. In this case, for the purpose of keeping the QQ alive, a heartbeat is sent at a relatively long interval, so the heartbeat interval is longer than the pre-allocated time slice. In addition, as shown in FIG. 4b, a heartbeat bandwidth requirement b2 is less than a pre-allocated bandwidth b1, and a duration t2 is also less than a pre-allocated time slice t1 (a duration of a single packet based heartbeat is often extremely short). Therefore, it can be seen from FIG. 4b that, radio resources (shown by the raised waveform portion) actually occupied by the heartbeat are far less than pre-allocated radio resources (shown by the solid line box), which causes a waste of radio resources. In this embodiment of the present invention, a protocol type of a data stream is identified, so as to determine a data stream suspected to include a heartbeat, the heartbeat is identified in this kind of data stream, heartbeat information such as the heartbeat bandwidth requirement b2 and the heartbeat duration t2 are acquired, then more suitable radio resource bandwidth and time allocation parameters are dynamically determined according to the heartbeat bandwidth requirement b2 and the heartbeat duration t2, and finally, radio resources are allocated according to these radio parameters. The radio resources allocated according to this embodiment of the present invention are exemplified by the dashed line box portion in FIG. 4b, and it can be seen that, the dashed line box portion is far less than the solid line box portion, that is, the pre-allocated radio resources. In this way, in this embodiment of the present invention, the waste of radio resources can be effectively reduced.

In an implementation manner, if a difference between the heartbeat interval period and the radio resource pre-allocated time slice is greater than a first threshold, a radio resource bandwidth allocation parameter is determined according to the heartbeat bandwidth requirement. It should be noted that, here, the first threshold may be flexibly set according to an empirical value or an actual application.

In another implementation manner, if a ratio of the heartbeat interval period to the radio resource pre-allocated time slice is greater than a second threshold, a radio resource bandwidth allocation parameter is determined according to the heartbeat bandwidth requirement. It should be noted that, here, the second threshold may be flexibly set according to an empirical value or an actual application, for example, 1.5 or 2.

It should be understood that, in this embodiment of the present invention, the greater the difference between the heartbeat interval period and the pre-allocated time slice is, the more obvious the radio resource optimizing effect provided by this embodiment of the present invention is.

In this embodiment of the present invention, the radio resource bandwidth allocation parameter may be determined, according to the heartbeat bandwidth requirement, to be M times of the heartbeat bandwidth requirement, where a value of M may be set to a numerical value greater than or equal to 1. It should be noted that, here, M may be set according to an empirical value or an actual application, so as to effectively deal with a bandwidth resource use peak.

Correspondingly, in an implementation manner, when the heartbeat interval period and the heartbeat bandwidth requirement are obtained in step S102, it indicates that the identified heartbeat service may be a single packet based heartbeat, so a radio resource time allocation parameter may not be set or a specific value may be also preset, and the value may be flexibly set according to an empirical value or an actual application, for example, preset to 6 s.

In another implementation manner, when the heartbeat interval period, the heartbeat bandwidth requirement, and the heartbeat duration are obtained in step S102, in step S103, not only the radio resource bandwidth allocation parameter is determined according to the heartbeat bandwidth requirement, but also a radio resource time allocation parameter needs to be determined according to the heartbeat duration. Specifically, the radio resource time allocation parameter may be determined, according to the heartbeat duration, to be K times of the heartbeat duration, where a value of K may be set to a numerical value greater than or equal to 1. It should be noted that, here, K may be set according to an empirical value or an actual application.

Step S104: Send a radio resource allocation parameter including the radio resource bandwidth allocation parameter.

Correspondingly, in an implementation manner, step S104 may be: sending a preset radio resource time allocation parameter and the radio resource bandwidth allocation parameter determined in step S103, or only sending the radio resource bandwidth allocation parameter determined in step S103.

In another implementation manner, step S104 may be: sending the radio resource bandwidth allocation parameter and the radio resource time allocation parameter that are determined in step S103.

It should be noted that, the radio resource time allocation parameter may be received by a base station. When the radio resource time allocation parameter is not sent, a radio base station may adopt a policy of releasing resources immediately after forwarding the data packet rather than waiting until timeout.

Figure 4C:
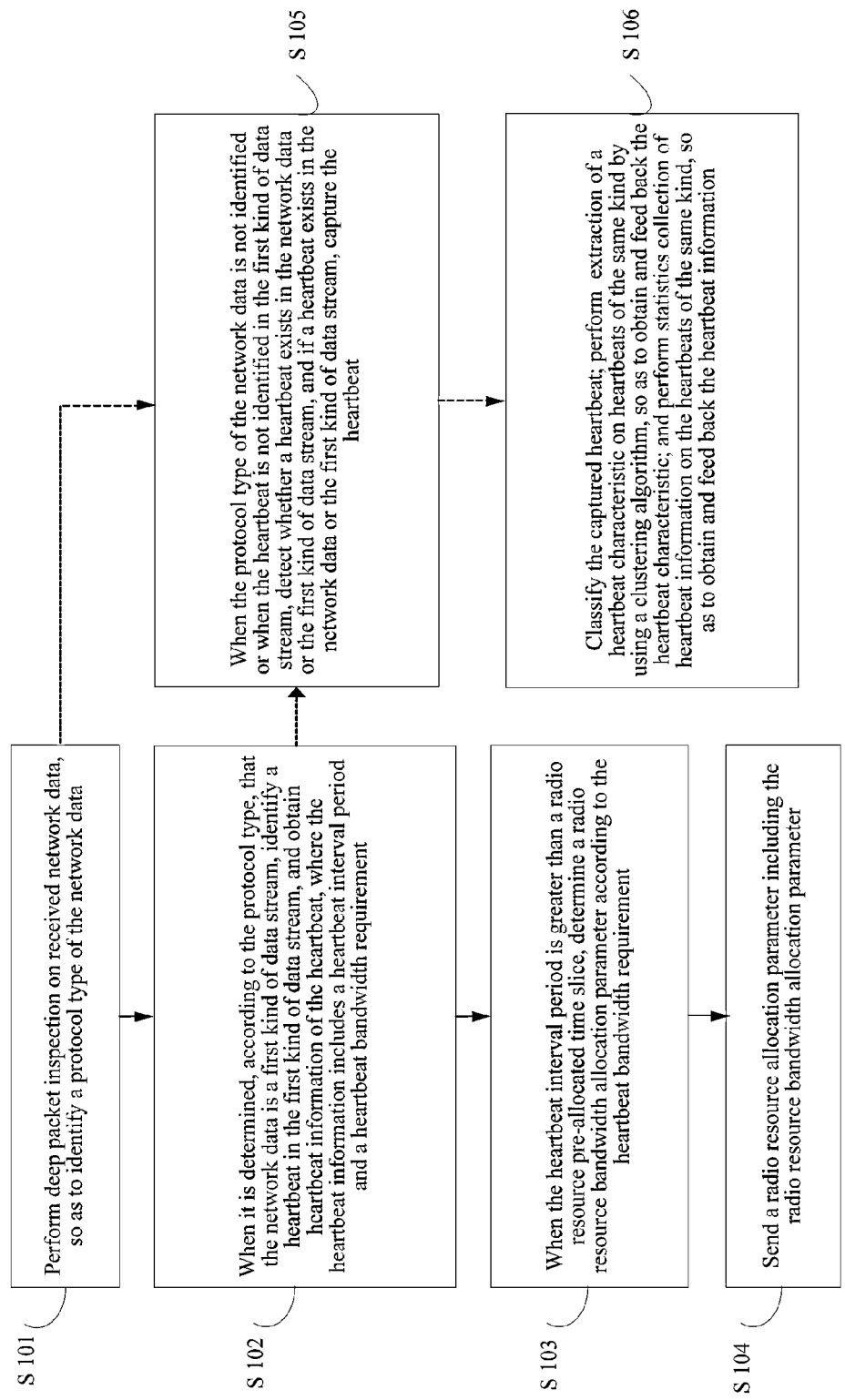
FIG. 4c is a schematic flow chart of another radio resource optimizing method according to an embodiment of the present invention.

Further, referring to FIG. 4c, FIG. 4c shows another resource optimizing method according to an embodiment of the present invention. As shown in FIG. 4c, step S101 to step S104 are the same as those in the foregoing embodiments and are not described again; in addition, the radio resource optimizing method according to this embodiment of the present invention further includes the following steps:

Step S105: When the protocol type of the network data is not identified in step S101 or when the heartbeat is not identified in the first kind of data stream in step S102, detect whether a heartbeat exists in the network data or the first kind of data stream, and if a heartbeat exists in the network data or the first kind of data stream, capture the heartbeat.

Step S106: Classify the captured heartbeat; perform extraction of a heartbeat characteristic on heartbeats of the same kind by using a clustering algorithm, so as to obtain and feed back the heartbeat characteristic; and perform statistics collection of heartbeat information on the heartbeats of the same kind, so as to obtain and feed back the heartbeat information.

It should be understood that, the heartbeat may be one data packet or may also be multiple data packets. The extracted heartbeat characteristic may include a traffic waveform, a packet length sequence, a direction sequence, packet length statistics information (such as a standard deviation), and an arrival time sequence of a data packet. The heartbeat information obtained through the statistics collection may include a heartbeat interval period and a heartbeat bandwidth requirement and may further include a heartbeat duration.

In an exemplary implementation manner, the extraction of the heartbeat characteristic may be implemented in an automatic characteristic extraction manner; in another implementation manner, the extraction of the heartbeat characteristic may also be implemented in a manual characteristic extraction manner, where the data packet is submitted to an analysis center through a network and a developer performs characteristic extraction on it.

After the heartbeat characteristic and the heartbeat information of the heartbeat are obtained, the heartbeat characteristic and the heartbeat information need to be fed back to existing heartbeat characteristics and heartbeat information, thereby promptly updating the heartbeat characteristic and the heartbeat information. The order of the feedback operations is not limited. Specifically, the heartbeat characteristic of the heartbeat may be synchronized to the heartbeat characteristics database, and the heartbeat information of the heartbeat is synchronized to the heartbeat information set. In an implementation manner, if the characteristic extraction operation, the heartbeat characteristics database, and the heartbeat information set are in the same network element, the heartbeat characteristic may be directly added into the heartbeat characteristics database and the heartbeat information may be directly added into the heartbeat information set. In another implementation manner, if the characteristic extraction operation, the heartbeat characteristics database, and the heartbeat information set are in different network elements, the heartbeat characteristic may be transmitted to the heartbeat characteristics database and the heartbeat information may be transmitted to the heartbeat information set through network transmission.

In sum, in the radio resource optimizing method according to this embodiment of the present invention, DPI deep packet inspection is performed on received network data, so as to identify a protocol type of the network data; when it is determined, according to the identified protocol type, that the network data is a first kind of data stream possibly including a heartbeat, the heartbeat is identified in the first kind of data stream, so as to obtain heartbeat information such as a heartbeat interval period and a heartbeat bandwidth requirement; when the heartbeat interval period is greater than a radio resource pre-allocated time slice, a radio resource bandwidth allocation parameter is determined according to the heartbeat bandwidth requirement; a radio resource allocation parameter including the radio resource bandwidth allocation parameter is delivered to a radio base station. In this way, in this embodiment of the present invention, the radio resource allocation parameter is dynamically set according to the heartbeat (a single packet based heartbeat, a multi-packet based heartbeat, a multi-packet interaction based heartbeat, and so on) bandwidth requirement and heartbeat duration when an application runs in the background for a long time, thereby improving the utilization rate of an air interface bandwidth and time of the radio base station when the application runs in the background, and avoiding a waste of radio resources.

Further, the radio resource optimizing method according to this embodiment of the present invention can detect a heartbeat of a data stream of an unknown protocol or a data stream whose heartbeat is not identified, extract a heartbeat characteristic of the heartbeat, collect statistics of heartbeat information of the heartbeat, and promptly update the heartbeat characteristic and the heartbeat information into identification modules for use. In this way, in this embodiment of the present invention, rapid correction of a protocol identification capability and a heartbeat identification capability is implemented, thereby supporting dynamic allocation of radio resources when more types of applications run in the background.

Figure 4D:
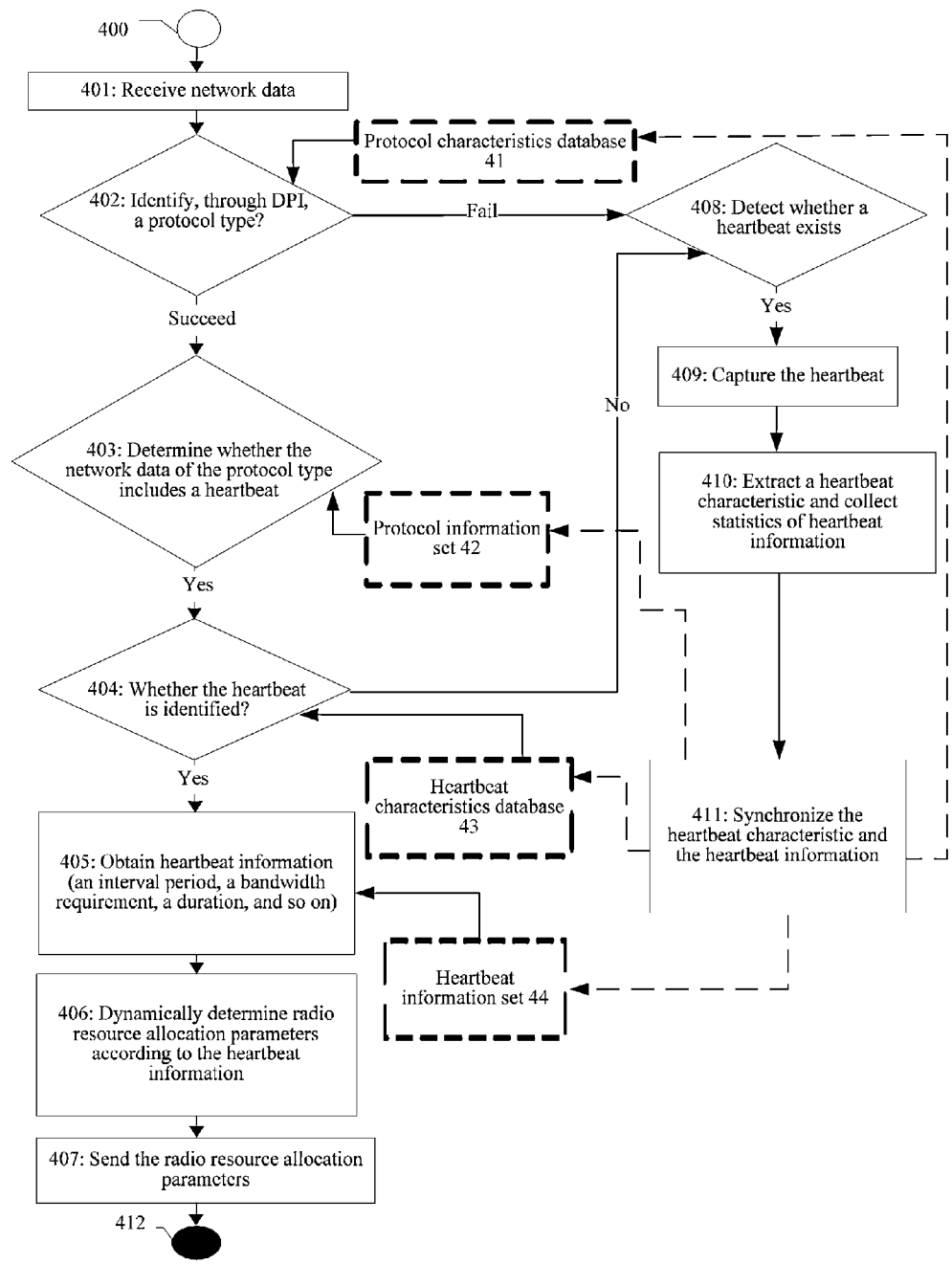
FIG. 4d is a specific schematic flow chart of another radio resource optimizing method according to an embodiment of the present invention.

Referring to FIG. 4d, FIG. 4d is a specific schematic flow chart of a radio resource optimizing method according to an embodiment of the present invention. The method may be executed inside a radio network controller RNC, may also be executed in a separate device outside the RNC, or may also be partially executed inside the RNC and partially executed in the separate device, which is not limited in this embodiment of the present invention. As shown in FIG. 4d, the method specifically includes the following steps:

Step 400: The procedure starts.

Step 401: Receive network data.

It should be noted that, the network data may be uplink network data from a radio base station or may also be downlink network data from a device such as a GGSN.

Step 402: Identify, using a DPI technology, an application protocol type of the network data received in step 401; if the identification succeeds, execute step 403; or if the identification fails, turn to step 408.

Specifically, a DPI protocol characteristics database 41 is first established, where various protocol types (the protocol type may be identified by a protocol ID) and corresponding protocol characteristic items may be stored in the DPI protocol characteristics database 41; a protocol characteristic of the network data is inspected using the DPI technology, and matching is performed on the protocol characteristic and a protocol characteristic item in the DPI protocol characteristics database 41, and when the matching succeeds, a protocol type of the network data corresponding to the protocol characteristic item matched successfully is obtained.

Step 403: Determine whether the network data of the protocol type possibly includes a heartbeat; if yes, turn to step 404; or if no, processing may not be performed on the network data, which is not limited in this embodiment of the present invention.

In this embodiment of the present invention, it can be known, according to historical experience, network data of which protocol types possibly include a heartbeat. For example, a QQ login protocol generally includes a QQ login keepalive heartbeat, and a QQ text chat protocol possibly includes a QQ chat keepalive heartbeat. The experience knowledge may be stored in a protocol information set 42. The protocol information set 42 may be implemented as a table including information such as a protocol identifier (for example, a protocol ID) and a heartbeat tag (for example, TRUE indicates that a heartbeat is included; and FALSE indicates that a heartbeat is not included). A corresponding heartbeat tag may be obtained by querying, according to the protocol identifier obtained in step 402, the table. If the heartbeat tag is TRUE, it indicates that the protocol of this type possibly includes a heartbeat, and processing in step 404 is executed on the network data possibly including a heartbeat; or if the heartbeat tag is FALSE, it indicates that the protocol of this type may not include a heartbeat, and an existing process is adopted to process a network data not including a heartbeat.

It is worth mentioning that, how to update the protocol characteristics database 41 in step 402 and the protocol information set 42 in step 403 promptly is described in detail in the following embodiment of the present invention, so as to identify more and more protocol types of network data, and determine, according to these protocol types, whether the network data includes a heartbeat.

Step 404: Determine whether the heartbeat is identified in the network data; if yes, execute step 405; or if no, turn to step 408.

In an implementation manner, first, a data packet in the network data is filtered according to a packet length condition (for example, the length is less than 100 bytes), so as to obtain a data packet meeting the packet length condition; then, characteristic matching is performed on a characteristic of the data packet meeting the packet length condition and a characteristic item in a pre-established heartbeat characteristics database 43, and when the matching succeeds, the data packet (the data packet may be a single data packet or may also be multiple data packets, which is not limited) may be identified to be a heartbeat. The heartbeat characteristics database 43 may include information such as a heartbeat identifier and a heartbeat characteristic (a behavior characteristic, a substring characteristic, an algorithm characteristic, and so on). After the characteristic of the data packet is successfully matched with the heartbeat characteristic in the heartbeat characteristics database 43, a heartbeat identifier corresponding to the heartbeat characteristic matched successfully may be obtained.

In another implementation manner, heartbeat characteristic matching is performed on each data packet in a network data stream, so as to determine whether a corresponding heartbeat identifier can be obtained.

Step 405: Obtain heartbeat information, which includes an interval period, a bandwidth requirement, and so on, by querying a heartbeat information set 44.

In an implementation manner, when the heartbeat is a single data packet, a duration of the heartbeat is extremely short and almost can be ignored, so the duration may not be stored in the heartbeat information set 44. The acquired heartbeat information includes the interval period, the bandwidth requirement, and so on.

In another implementation manner, when the heartbeat is multiple data packets, the heartbeat may be an interaction based heartbeat (for example, PING-PONG interaction of an SNS application) coming from a user and a server. The duration of the heartbeat is relatively long and may be stored in the heartbeat information set 44, so information such as an interval period, a bandwidth requirement, and a duration may be acquired from the heartbeat information set 44, so as to facilitate subsequent setting of radio resource bandwidth and time parameters according to the bandwidth requirement and the duration.

How to update the heartbeat characteristics database 43 in step 404 and the heartbeat information set 44 in step 405 promptly is described in detail in the following embodiment of the present invention, so as to deal with changes such as application upgrading, identify more types of heartbeats, and obtain heartbeat information of the heartbeat.

Step 406: Dynamically determine a radio resource allocation parameter according to the heartbeat information.

When a heartbeat interval period is greater than a radio resource pre-allocated time slice (generally, 10 s), the radio resource allocation parameter is dynamically determined according to the heartbeat information.

In an implementation manner, if a difference between the heartbeat interval period and the radio resource pre-allocated time slice is greater than 90 s, a radio resource bandwidth allocation parameter is determined according to a heartbeat bandwidth requirement.

In another implementation manner, if a ratio of the heartbeat interval period to the radio resource pre-allocated time slice is greater than 3.5, a radio resource bandwidth allocation parameter is determined according to the heartbeat bandwidth requirement.

Correspondingly, in an implementation manner, when the heartbeat is a single data packet, the radio resource bandwidth allocation parameter may be set to M (M∈[1.1, 1.5]) times of the heartbeat bandwidth requirement, and a radio resource time allocation parameter is set to a specific value.

In another implementation manner, when the heartbeat is multiple data packets, the radio resource bandwidth allocation parameter may be set to M (M∈[1.1, 1.5]) times of the heartbeat bandwidth requirement, and a radio resource time allocation parameter is set to K (K∈[1.5, 2]) times of the heartbeat duration.

Step 407: Send the radio resource allocation parameter.

Correspondingly, in an implementation manner, when the heartbeat is a single data packet, the radio resource bandwidth allocation parameter set according to the heartbeat bandwidth requirement and a preset radio resource time allocation parameter are sent, or only the radio resource bandwidth allocation parameter set according to the heartbeat bandwidth requirement is sent.

In another implementation manner, when the heartbeat is multiple data packets, the radio resource bandwidth allocation parameter set according to the heartbeat bandwidth requirement and a radio resource time allocation parameter set according to the heartbeat duration are sent.

It should be understood that, here, a network device to which the radio resource allocation parameter is sent is specifically decided according to a position of the radio resource optimizing apparatus according to this embodiment of the present invention in network deployment. The radio resource allocation parameter may be sent to a base station (see FIG. 1*b*) or the radio resource allocation parameter may also be first sent to a radio network controller RNC (see FIG. 2*b* and FIG. 3*b*), and so on.

It is worth mentioning that, when the heartbeat is a single data packet, besides allocating a specific time slice to the user, the radio base station may adopt a policy of releasing resources immediately after forwarding the data packet. Compared with allocation of the specific time slice to the user, the immediate releasing policy does not need to wait until timeout.

Step 408: Detect whether a heartbeat exists; if yes, execute step 409; or if no, processing may not be performed.

Condition 1: When the protocol type of the network data is not identified in step 402, step 408 is executed; and in this case, it is detected whether a heartbeat exists in the network data of an unknown protocol type.

Condition 2: When the heartbeat is not identified in the network data in step 404, step 408 is executed. The reason for the occurrence of this case may be as follows: an application protocol is upgraded, and as a result, the heartbeat included in the network data is changed, and the characteristic of the heartbeat fails to be matched with a characteristic item in the heartbeat characteristics database 43, or the heartbeat in the network data does not exist.

It should be noted that, as long as any one of condition 1 and condition 2 is satisfied, step 408 is executed.

Specifically, first, the data packet in the network data is buffered in a buffer space; it is determined, by searching a data stream table for quintuple information (a source IP, a source port, a destination IP, a destination port, and a transmission protocol), whether the network data is a new stream; if the network data is a new stream, a new data stream record is inserted in the data stream table, and a new buffer space is allocated to buffer the network data stream; or if the network data is not a new stream, the data stream table is searched for a buffer space entrance (the buffer space entrance may be a memory address or may also be a pointer address, which is not limited) of the network data according to the quintuple information of the network data, and the data packet in the network data stream is buffered in a buffer space pointed to by the entrance.

Then, matching is performed on a behavior characteristic of the data packet buffered in the buffer space and a heartbeat behavior characteristic (for example, a packet length is less than 100 bytes, a timing sequence time is less than 1 s, and a silence time exceeds 60 s); if the matching succeeds, it is determined that a heartbeat exists in the network data, or if the matching fails, a next data packet of the network data is continuously buffered in the buffer space, and a wait for more data packets is performed, so that heartbeat behavior characteristic matching is performed on the more data packets.

In this process, a buffer space allocated to the network data may be released regularly, and a data stream record in the stream table corresponding to the network data is deleted, so as to promptly release network data whose heartbeat is not detected within a certain period of time, thereby ensuring that a sufficient buffer space is available for buffering other network data.

Step 409: Capture the heartbeat. The data in the buffer in step 408 is written into a disk array and submitted for characteristic extraction in the next step.

Step 410: Extract a heartbeat characteristic and collect statistics of heartbeat information.

In an exemplary implementation manner, first, data packets written into the disk in step 409 are read, and the data packets are classified according to information such as a transmission protocol, traffic, a transmission rate, and a port.

Then, characteristic extraction is performed on each kind of data packet by using a clustering algorithm (for example, an LCS (Longest Common Subsequence) algorithm) based on one or more dimensions such as a packet length, a characteristic string, an arrival time, and a transmission rate.

Then, characteristic matching check is performed on the extracted characteristic and this kind of data packet obtained through classification.

Finally, after the characteristic extraction succeeds, statistics of a bandwidth requirement, a duration, and an interval period of data packets of the same kind are collected. The interval period may be simulated and predicted in a manner such as a Fourier function or may also be obtained through simple probability distribution analysis.

In another implementation manner, in step 410, a manual characteristic extraction manner may also be adopted, where the data packet is submitted to an analysis center through a network and a developer performs extraction of a heartbeat characteristic and statistics collection of heartbeat information on it.

It is worth mentioning that, in this embodiment of the present invention, pre-established characteristics databases (the protocol characteristics database 41 and the heartbeat characteristics database 43) and pre-established information sets (the protocol information set 42 and the heartbeat information set 44) may also be established by analyzing and extracting a characteristic and information of each kind of network data or heartbeat in a manual manner or an automatic manner here.

Step 411: Synchronize the heartbeat characteristic and the heartbeat information, where the heartbeat characteristic is synchronized into the heartbeat characteristics database 43 and the heartbeat information is synchronized into the heartbeat information set 44.

Specifically, in this step, a network transmission manner may be adopted to update a new characteristic into the heartbeat characteristics database 43 and synchronize the heartbeat information obtained through the statistics collection into the heartbeat information set 44. An active/standby database switchover manner may be adopted for the heartbeat characteristics database 43 and the heartbeat information set 44, so as to implement lossless upgrading without service interruption, thereby completing the updating process of the characteristics database or the information set.

It is worth mentioning that, when a heartbeat packet (the heartbeat packet may be a single packet or may also be multiple packets, which is not limited) in the network data is located at the front end of a network data stream, a characteristic of the heartbeat packet may also be used to identify the protocol type, so the heartbeat characteristic may also be synchronized into the protocol characteristics database 41; and meanwhile, network data of the protocol type possibly includes a heartbeat, so the protocol type is added into the protocol information set 42, and a corresponding heartbeat tag is set to TRUE.

Step 412: The procedure ends.

In sum, in the radio resource optimizing method according to this embodiment of the present invention, DPI deep packet inspection is performed on received network data, so as to identify a protocol type of the network data; when it is determined, according to the identified protocol type, that the network data is a first kind of data stream possibly including a heartbeat, the heartbeat (a single packet based heartbeat or a multi-packet based heartbeat) is identified in the first kind of data stream, so as to obtain heartbeat information such as a heartbeat interval period and a heartbeat bandwidth requirement; when the heartbeat interval period is greater than a radio resource pre-allocated time slice, a radio resource bandwidth allocation parameter is determined according to the heartbeat bandwidth requirement; a radio resource allocation parameter including the radio resource bandwidth allocation parameter is delivered to a radio base station. In this way, in this embodiment of the present invention, the radio resource allocation parameter is dynamically set when an application runs in the background for a long time, thereby improving the utilization rate of an air interface bandwidth and time of the radio base station when the application runs in the background, and avoiding a waste of radio resources.

Further, in this embodiment of the present invention, a single packet based heartbeat and a multi-packet based heartbeat can be identified, heartbeats of multiple kinds of applications can be identified, and radio resource time and bandwidth allocation parameters are dynamically set according to heartbeat information, thereby effectively reducing a waste of resources that is caused by statically setting radio resources.

Furthermore, in this embodiment of the present invention, a heartbeat of a data stream of an unknown protocol or a data stream whose heartbeat is not identified can be detected, a heartbeat characteristic of the heartbeat is extracted, statistics of heartbeat information of the heartbeat are collected, and the heartbeat characteristic and the heartbeat information are promptly updated into identification modules for use. In this way, in this embodiment of the present invention, rapid correction of a protocol identification capability and a heartbeat identification capability is implemented, thereby supporting dynamic allocation of radio resources when more types of applications run in the background.

Figure 5A:
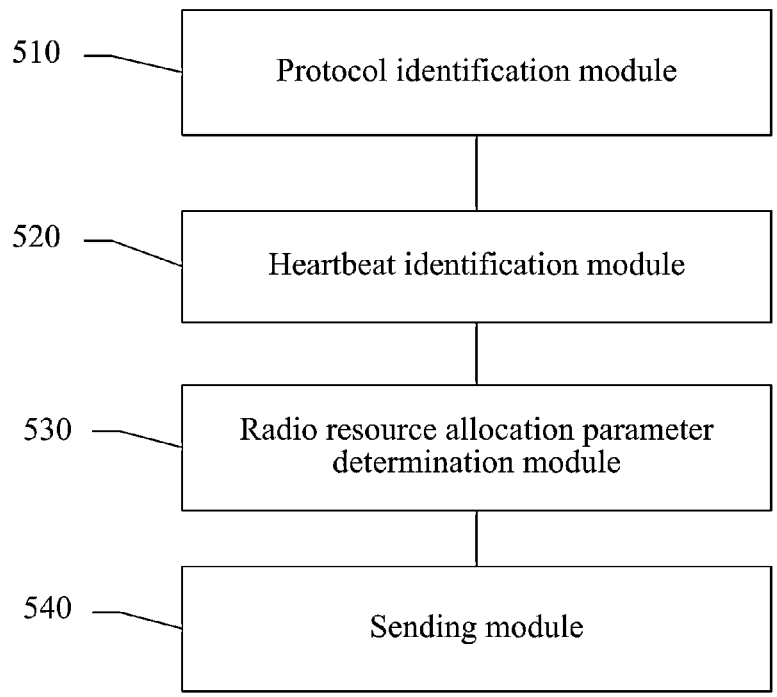
FIG. 5a is a schematic diagram of a logical structure of a radio resource optimizing apparatus according to an embodiment of the present invention.

Referring to FIG. 5a, FIG. 5a is a schematic structural diagram of a radio resource optimizing apparatus according to an embodiment of the present invention. As shown in FIG. 5a, the radio resource optimizing apparatus according to this embodiment of the present invention includes the following modules.

A protocol identification module 510 is configured to perform deep packet inspection (DPI) on received network data, so as to identify a protocol type of the network data; and specifically, a DPI protocol identification engine performs matching on a characteristic of network data inspected using a DPI technology and a characteristic item in a pre-established protocol characteristics database, and if the matching succeeds, a protocol type identifier corresponding to the characteristic item matched successfully is obtained; and a pre-established protocol information set may be queried according to the protocol type identifier to determine whether a protocol of this type possibly includes a heartbeat.

It should be noted that, in this embodiment of the present invention, the protocol characteristics database and the protocol information set may be integrated in the protocol identification module 510, or may also be deployed in a separate data storage device, for example, in a database. The data storage device has a communication connection to the protocol identification module 510, which is not limited in this embodiment of the present invention.

A heartbeat identification module 520 is configured to: when it is determined, according to the protocol type, that the network data is a first kind of data stream, identify a heartbeat in the first kind of data stream, and obtain heartbeat information of the heartbeat, where the heartbeat information includes a heartbeat interval period and a heartbeat bandwidth requirement; and the first kind of data stream is a data stream that possibly includes a heartbeat and is determined according to the protocol type of the network data. For example, network data belonging to a QQ login protocol possibly includes a QQ login keepalive heartbeat, and in this case, the network data is determined as the first kind of data stream, and heartbeat identification is performed on the network data to identify the heartbeat of the network data.

In an implementation manner, the heartbeat identification module 520 is specifically configured to perform matching on a characteristic of a data packet in the first kind of data stream and a characteristic item in a heartbeat characteristics database, and when the matching succeeds, obtain a heartbeat identifier corresponding to the characteristic item matched successfully; and obtain heartbeat information corresponding to the heartbeat identifier from a heartbeat information set according to the heartbeat identifier, where the heartbeat information includes the heartbeat interval period and the heartbeat bandwidth requirement.

In another implementation manner, the heartbeat identification module 520 is specifically configured to filter a data packet in the first kind of data stream according to a packet length condition, so as to obtain a data packet with a packet length less than a specific value in the first kind of data stream;

perform characteristic matching on a characteristic of the data packet with the packet length less than the specific value and a characteristic item in a heartbeat characteristics database, and when the matching succeeds, obtain a heartbeat identifier corresponding to the characteristic item matched successfully; and obtain heartbeat information corresponding to the heartbeat identifier from a heartbeat information set according to the heartbeat identifier, where the heartbeat information includes the heartbeat interval period and the heartbeat bandwidth requirement.

It should be noted that, in this embodiment of the present invention, the heartbeat characteristics database and the heartbeat information set may be integrated in the heartbeat identification module 520, or may also be deployed in a separate data storage device, for example, in a database. The data storage device has a communication connection to the heartbeat identification module 520, which is not limited in this embodiment of the present invention.

A radio resource allocation parameter determination module 530 is configured to: when the heartbeat interval period is greater than a radio resource pre-allocated time slice, determine a radio resource bandwidth allocation parameter according to the heartbeat bandwidth requirement.

Further, the radio resource allocation parameter determination module 530 is further configured to determine a radio resource time allocation parameter according to a heartbeat duration.

A sending module 540 is configured to send a radio resource allocation parameter including the radio resource bandwidth allocation parameter.

In an implementation manner, the sending module 540 is specifically configured to send the radio resource bandwidth allocation parameter and a preset radio resource time allocation parameter.

In another implementation manner, the sending module 540 is specifically configured to send the radio resource bandwidth allocation parameter and the radio resource time allocation parameter.

It should be understood that, when the radio resource optimizing apparatus in this embodiment of the present invention is located in different deployment positions in a network, sending targets are different. When the radio resource optimizing apparatus acts as an external apparatus of an RNC, here, the radio resource bandwidth allocation parameter and the radio resource time allocation parameter are sent to the RNC.

When the radio resource optimizing apparatus is integrated in the RNC, here, the radio resource bandwidth allocation parameter and the radio resource time allocation parameter are sent to a radio base station.

Figure 5B:
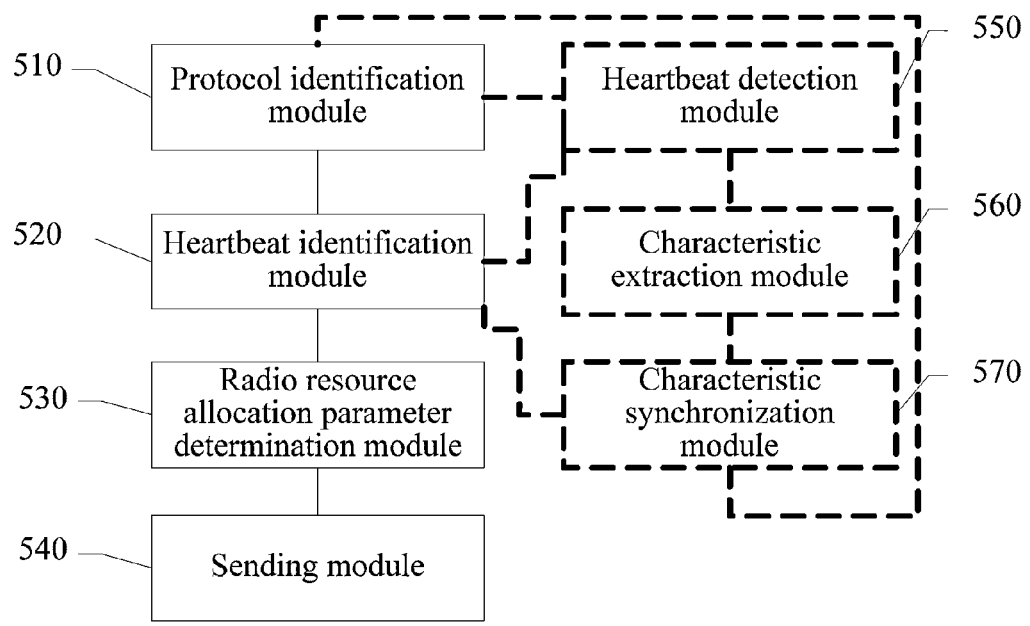
FIG. 5b is a schematic diagram of a logical structure of another radio resource optimizing apparatus according to an embodiment of the present invention.

Further, referring to FIG. 5b, FIG. 5b shows another radio resource optimizing apparatus according to an embodiment of the present invention, where the module 510 to the module 540 are the same as those in the foregoing embodiment and are not described again. The radio resource optimizing apparatus according to this embodiment of the present invention further includes the following modules.

A heartbeat detection module 550 is configured to: when the DPI protocol identification module does not identify the protocol type of the network data, detect whether a heartbeat exists in the network data; and if a heartbeat exists in the network data, capture the heartbeat.

The heartbeat detection module 550 is further configured to: when the matching between the characteristic of the data packet in the first kind of data stream and the characteristic item in the heartbeat characteristics database fails, detect whether a heartbeat exists in the first kind of data stream; and if a heartbeat exists in the first kind of data stream, capture the heartbeat.

A characteristic extraction module 560 is configured to classify the captured heartbeat; perform extraction of a heartbeat characteristic on heartbeats of the same kind by using a clustering algorithm, so as to obtain and feed back the heartbeat characteristic; and perform statistics collection of heartbeat information on the heartbeats of the same kind, so as to obtain and feed back the heartbeat information.

In an implementation manner, the characteristic extraction module 560 may be integrated with a characteristic feedback function and feed back and update the extracted characteristic and information obtained through analysis to a corresponding characteristics database or information set.

In another implementation manner, as shown in FIG. 5b, the characteristic extraction module 560 is only responsible for extracting the characteristic and analyzing the heartbeat information. A characteristic synchronization module 570 is configured to synchronize the heartbeat characteristic extracted by the characteristic extraction module 560 into a heartbeat characteristics database of the heartbeat identification module 520, and synchronize the heartbeat information obtained through the statistics collection into a heartbeat information set of the heartbeat identification module 520, thereby implementing the characteristic feedback function.

It is worth mentioning that, because the heartbeat characteristic extracted by the characteristic extraction module 560 may be further used to identify a network data protocol, the characteristic synchronization module 570 is further configured to synchronize the heartbeat characteristic into a protocol characteristics database of the protocol identification module 510, and synchronize the heartbeat information obtained through the statistics collection into a protocol information set of the protocol identification module 510. Different synchronization manners may be specifically selected according to different implementation manners or positions of the characteristics database and information set.

It should be noted that, as shown in FIG. 5*b*, that the heartbeat characteristic obtained through the extraction and the heartbeat information obtained through the statistics collection are synchronized into the heartbeat identification module 520 and the protocol identification module 510 (see dashed arrows from the module 570 to the module 520 and the module 510 in FIG. 5*b*, respectively) is only an example of an implementation manner, that is, the heartbeat characteristics database and the heartbeat information set may be integrated in the heartbeat identification module 520, and the protocol characteristics database and the protocol information set may be integrated in the protocol identification module 510. Definitely, the characteristics database and the information set may also be deployed in a separate data storage device. The data storage device has a communication relationship with the protocol identification module 510 and the heartbeat identification module 520, and correspondingly, the heartbeat characteristic and the heartbeat information may also be synchronized into the data storage device. The number of storage devices in which the protocol characteristics database, the protocol information set, the heartbeat characteristics database, and the heartbeat information set are deployed may be multiple or may also be one, which is not limited in this embodiment of the present invention.

In addition, it should be noted that, the radio resource optimizing apparatus in this embodiment of the present invention may specifically be a radio network controller (RNC) or a separate device having a communication connection to the radio network controller (RNC); may also be partially integrated in the RNC and partially forms a separate device; and may be implemented using pure software, or may also be implemented using a combination of software and hardware. Division of modules in this embodiment of the present invention is not limited, and persons of ordinary skill in the art may carry out division in other manners as required.

In sum, in the radio network controller according to this embodiment of the present invention, the protocol identification module performs deep packet inspection on received network data, so as to identify a protocol type of the network data; when it is determined, according to the identified protocol type, that the network data is a first kind of data stream possibly including a heartbeat, the heartbeat identification module identifies a heartbeat in the first kind of data stream, so as to obtain heartbeat information such as a heartbeat interval period and a heartbeat bandwidth requirement; the radio resource allocation parameter determination module determines whether the heartbeat interval period is greater than a radio resource pre-allocated time slice, and if yes, determines a radio resource bandwidth allocation parameter according to the heartbeat bandwidth requirement and delivers a radio resource allocation parameter including the radio resource bandwidth allocation parameter to a radio base station. In this way, in this embodiment of the present invention, the radio resource allocation parameter is dynamically set when an application runs in the background for a long time, thereby improving the utilization rate of an air interface bandwidth and time of the radio base station when the application runs in the background, and avoiding a waste of radio resources.

Further, the heartbeat detection module detects a heartbeat of a data stream of an unknown protocol or a data stream whose heartbeat is not identified; the characteristic extraction module extracts a heartbeat characteristic of the heartbeat detected by the heartbeat detection module, and collects statistics of heartbeat information of the heartbeat; and the characteristic synchronization module promptly updates the heartbeat characteristic and the heartbeat information into identification modules for use, thereby implementing rapid correction of a protocol identification capability and a heartbeat identification capability, and supporting dynamic allocation of radio resources when more types of applications run in the background.

Persons of ordinary skill in the art should understand that, all or a part of the steps in the method embodiments may be implemented by a computer program instructing relevant hardware (for example, a processor). The program may be stored in a computer readable storage medium. When the program is run, the steps in the method embodiments are performed. The storage medium may be a magnetic disk, an optical disk, a read-only memory (Read-Only Memory, ROM), a random access memory (Random Access Memory, RAM), or the like. This document uses specific examples to illustrate the principles and implementation manners of the present invention. Descriptions of the preceding embodiments are merely intended to help to understand the method and ideas of the present invention. Meanwhile, persons of ordinary skill in the art may make variations to the specific implementation manners and application scopes according to the ideas of the present invention. In sum, the content in this specification shall not be understood as restrictions on the present invention.

The foregoing descriptions are merely specific embodiments of the present invention. It should be noted by persons of ordinary skill in the art that modifications and variations may be made without departing from the principle of the present invention, which should be construed as falling within the protection scope of the present invention.

What is claimed is:

1. A radio resource allocation method in a radio access network (RAN), wherein when a User Equipment (UE) enters a standby state, the RAN adjusts a state to IDLE, and when the UE sends data, the RAN switches to pre-allocate a radio resource pre-allocated time slice with a fixed time and a channel with a fixed bandwidth, and when allocating radio resources, the method comprises:

performing deep packet inspection on received network data, so as to identify a protocol type of the received network data;

when it is determined, according to the protocol type, that the received network data is a first kind of data stream, identifying a heartbeat in the first kind of the data stream, and obtaining heartbeat information of the heartbeat, wherein the heartbeat information comprises a heartbeat interval period and a heartbeat bandwidth requirement;

when the heartbeat interval period is greater than the radio resource pre-allocated time slice, determining a radio resource bandwidth allocation parameter according to the heartbeat bandwidth requirement, wherein the heartbeat bandwidth requirement is less than the fixed bandwidth, and wherein the radio resource bandwidth allocation parameter includes a heartbeat bandwidth that is greater than or equal to the heartbeat bandwidth requirement but less than the fixed bandwidth; and sending a radio resource allocation parameter comprising the radio resource bandwidth allocation parameter.

2. The method according to claim 1, wherein when the received network data is the first kind of the data stream, the identifying the heartbeat in the first kind of the data stream, and the obtaining the heartbeat information of the heartbeat comprise:
performing matching on a characteristic of a data packet in the first kind of the data stream and a characteristic item in a heartbeat characteristics database, and when the matching succeeds, obtaining a heartbeat identifier corresponding to the characteristic item matched successfully; and
obtaining, according to the heartbeat identifier, the heartbeat information corresponding to the heartbeat identifier from a heartbeat information set.

3. The method according to claim 1, wherein when the received network data is the first kind of the data stream, the identifying the heartbeat in the first kind of the data stream, and the obtaining the heartbeat information of the heartbeat comprise:
filtering a data packet in the first kind of the data stream according to a packet length condition, so as to obtain a data packet with a packet length less than a specific value in the first kind of the data stream;
performing characteristic matching on a characteristic of the data packet with the packet length less than the specific value and a characteristic item in a heartbeat characteristics database, and when the characteristic matching succeeds, obtaining a heartbeat identifier corresponding to the characteristic item matched successfully; and
obtaining, according to the heartbeat identifier, the heartbeat information corresponding to the heartbeat identifier from a heartbeat information set.

4. The method according to claim 1, further comprising:
when the protocol type of the received network data is not identified or when the heartbeat is not identified in the first kind of the data stream, detecting whether an additional heartbeat exists in the received network data or the first kind of the data stream, and if the additional heartbeat exists in the received network data or the first kind of the data stream, capturing the additional heartbeat; and
classifying the captured additional heartbeat; performing extraction of a heartbeat characteristic on heartbeats of a same kind as the captured additional heartbeat by using a clustering algorithm, so as to obtain and feed back the heartbeat characteristic; and performing statistics collection of additional heartbeat information on the heartbeats of the same kind, so as to obtain and feed back the additional heartbeat information.

5. The method according to claim 2, further comprising:
when the protocol type of the received network data is not identified, detecting whether an additional heartbeat exists in the received network data; and if the additional heartbeat exists in the received network data, capturing the additional heartbeat;
classifying the captured additional heartbeat; performing extraction of a heartbeat characteristic on heartbeats of a same kind as the captured additional heartbeat by using a clustering algorithm, so as to obtain the heartbeat characteristic; and performing statistics collection of additional heartbeat information on the heartbeats of the same kind, so as to obtain the additional heartbeat information; and
updating the heartbeat characteristic of the additional heartbeat into the heartbeat characteristics database, and updating the additional heartbeat information of the heartbeats into the heartbeat information set.

6. The method according to claim 2, further comprising:
when the heartbeat is not identified in the first kind of the data stream, detecting whether a heartbeat exists in the first kind of data stream, and if the heartbeat exists in the first kind of the data stream, capturing the additional heartbeat;
classifying the captured additional heartbeat; performing extraction of a heartbeat characteristic on heartbeats of a same kind as the captured additional heartbeat by using a clustering algorithm, so as to obtain the heartbeat characteristic; and performing statistics collection of additional heartbeat information on the heartbeats of the same kind, so as to obtain the additional heartbeat information; and
updating the heartbeat characteristic of the additional heartbeat into the heartbeat characteristics database, and updating the additional heartbeat information of the heartbeats into the heartbeat information set.

7. The method according to claim 1, wherein the heartbeat information further comprises a heartbeat duration;
the method further comprises: determining a radio resource time allocation parameter according to the heartbeat duration; and
the sending a radio resource allocation parameter comprising the radio resource bandwidth allocation parameter comprises: sending the radio resource bandwidth allocation parameter and the radio resource time allocation parameter.

8. The method according to claim 1, wherein the sending the radio resource allocation parameter comprising the radio resource bandwidth allocation parameter comprises: sending the radio resource bandwidth allocation parameter and a preset radio resource time allocation parameter.

9. A radio resource allocation apparatus in a radio access network (RAN), wherein when a User Equipment (UE) enters a standby state, the RAN adjusts a state to IDLE, and when the UE sends data, the RAN switches to pre-allocate a radio resource pre-allocated time slice with a fixed time and a channel with a fixed bandwidth, and the apparatus is configured to allocate radio resources, comprising:
a protocol identification module, configured to perform deep packet inspection on received network data, so as to identify a protocol type of the received network data;
a heartbeat identification module, configured to, when it is determined, according to the protocol type, that the received network data is a first kind of data stream, identify a heartbeat in the first kind of the data stream, and obtain heartbeat information of the heartbeat, wherein the heartbeat information comprises a heartbeat interval period and a heartbeat bandwidth requirement;
a radio resource allocation parameter determination module, configured to, when the heartbeat interval period is greater than the radio resource pre-allocated time slice, determine a radio resource bandwidth allocation parameter according to the heartbeat bandwidth requirement, wherein the heartbeat bandwidth requirement is less than the fixed bandwidth, and wherein the radio resource bandwidth allocation parameter includes a heartbeat bandwidth that is greater than or equal to the heartbeat bandwidth requirement but less than the fixed bandwidth; and
a sending module, configured to send a radio resource allocation parameter comprising the radio resource bandwidth allocation parameter.

10. The apparatus according to claim 9, wherein the heartbeat identification module is configured to perform matching on a characteristic of a data packet in the first kind of the data stream and a characteristic item in a heartbeat characteristics database, and when the matching succeeds, obtain a heartbeat identifier corresponding to the characteristic item matched successfully; and obtain, according to the heartbeat identifier, the heartbeat information corresponding to the heartbeat identifier from a heartbeat information set.

11. The apparatus according to claim 9, wherein the heartbeat identification module is configured to filter a data packet in the first kind of the data stream according to a packet length condition, so as to obtain a data packet with a packet length less than a specific value in the first kind of the data stream; perform matching on a characteristic of the data packet with the packet length less than the specific value and a characteristic item in a heartbeat characteristics database, and when the matching succeeds, obtain a heartbeat identifier corresponding to the characteristic item matched successfully; and obtain, according to the heartbeat identifier, the heartbeat information corresponding to the heartbeat identifier from a heartbeat information set.

12. The apparatus according to claim 9, further comprising:
 a heartbeat detection module, configured to: when the protocol type of the network data is not identified or when the heartbeat is not identified in the first kind of the data stream, detect whether an additional heartbeat exists in the network data or the first kind of data stream, and if the additional heartbeat exists in the network data or the first kind of the data stream, capture the additional heartbeat; and
 a characteristic extraction module, configured to classify the captured additional heartbeat; perform extraction of a heartbeat characteristic on heartbeats of a same kind as the captured additional heartbeat by using a clustering algorithm, so as to obtain and feed back the heartbeat characteristic; and perform statistics collection of additional heartbeat information on the heartbeats of the same kind, so as to obtain and feed back the additional heartbeat information.

13. The apparatus according to claim 10, further comprising:
 a heartbeat detection module, configured to: when the protocol identification module does not identify the protocol type of the network data, detect whether an additional heartbeat exists in the network data; and if the additional heartbeat exists in the network data, capture the additional heartbeat;
 a characteristic extraction module, configured to classify the captured additional heartbeat; perform extraction of a heartbeat characteristic on heartbeats of a same kind as the captured additional heartbeat by using a clustering algorithm, so as to obtain the heartbeat characteristic; and perform statistics collection of additional heartbeat information on the heartbeats of the same kind, so as to obtain the additional heartbeat information; and
 a characteristic synchronization module, configured to update the heartbeat characteristic of the additional heartbeat obtained by the characteristic extraction module into the heartbeat characteristics database, and update the additional heartbeat information of the additional heartbeat obtained by the characteristic extraction module into the heartbeat information set.

14. The apparatus according to claim 13, wherein the heartbeat detection module is further configured to: when the heartbeat identification module does not identify the heartbeat in the first kind of data stream, detect whether the additional heartbeat exists in the first kind of the data stream; and if the additional heartbeat exists in the first kind of the data stream, capture the additional heartbeat.

15. The apparatus according to claim 9, wherein the heartbeat information further comprises a heartbeat duration;
 the radio resource allocation parameter determination module is further configured to determine a radio resource time allocation parameter according to the heartbeat duration; and
 the sending module is configured to send the radio resource bandwidth allocation parameter and the radio resource time allocation parameter.

16. The apparatus according to claim 9, wherein
 the sending module is configured to send the radio resource bandwidth allocation parameter and a preset radio resource time allocation parameter.

17. A radio resource allocation system in a radio access network (RAN), wherein when a User Equipment (UE) enters a standby state, the RAN adjusts a state to IDLE, and when the UE sends data, the RAN switches to pre-allocate a radio resource pre-allocated time slice with a fixed time and a channel with a fixed bandwidth, and the radio resource allocation system is configured to allocate radio resources, comprising a radio network controller and a radio base station, wherein:
 the radio base station is configured to send network data from a user equipment to the radio network controller, receive a radio resource allocation parameter delivered by the radio network controller, and perform the radio resource allocation; and
 the radio network controller is configured to:
  perform deep packet inspection on received network data from the radio base station, so as to identify a protocol type of the received network data;
  when it is determined, according to the protocol type, that the received network data is a first kind of data stream, identify a heartbeat in the first kind of the data stream, and obtain heartbeat information of the heartbeat, wherein the heartbeat information comprises a heartbeat interval period and a heartbeat bandwidth requirement;
  when the heartbeat interval period is greater than the radio resource pre-allocated time slice, determine a radio resource bandwidth allocation parameter according to the heartbeat bandwidth requirement, wherein the heartbeat bandwidth requirement is less than the fixed bandwidth, and wherein the radio resource bandwidth allocation parameter includes a heartbeat bandwidth that is greater than or equal to the heartbeat bandwidth requirement but less than the fixed bandwidth; and
  send a radio resource allocation parameter comprising the radio resource bandwidth allocation parameter to the radio base station.

18. A radio resource allocation system in a radio access network (RAN), wherein when a User Equipment (UE) enters a standby state, the RAN adjusts a state to IDLE, and when the UE sends data, the RAN switches to pre-allocate a radio resource pre-allocated time slice with a fixed time and a channel with a fixed bandwidth, and the radio resource allocation system is configured to allocate radio resources, comprising:
 a radio base station,
 a radio network controller, and
 a radio resource allocating apparatus having a communication connection to the radio network controller, wherein:
the radio base station is configured to send network data from a user equipment to the radio network controller, receive a radio resource allocation parameter delivered by the radio network controller, and perform the radio resource allocation;
the radio network controller is configured to receive the network data sent by the radio base station, send the network data or a mirror of the network data to the radio resource optimizing apparatus, and send the radio resource allocation parameter from the radio resource optimizing apparatus to the radio base station; and
the radio resource optimizing apparatus is configured to:
perform deep packet inspection on received network data from the radio network controller, so as to identify a protocol type of the received network data;
when it is determined, according to the protocol type, that the received network data is a first kind of data stream, identify a heartbeat in the first kind of the data stream, and obtain heartbeat information of the heartbeat, wherein the heartbeat information comprises a heartbeat interval period and a heartbeat bandwidth requirement;
when the heartbeat interval period is greater than the radio resource pre-allocated time slice, determine a radio resource bandwidth allocation parameter according to the heartbeat bandwidth requirement, wherein the heartbeat bandwidth requirement is less than the fixed bandwidth, and wherein the radio resource bandwidth allocation parameter includes a heartbeat bandwidth that is greater than or equal to the heartbeat bandwidth requirement but less than the fixed bandwidth; and
send a radio resource allocation parameter comprising the radio resource bandwidth allocation parameter to the radio network controller.

* * * * *

UNITED STATES PATENT AND TRADEMARK OFFICE
CERTIFICATE OF CORRECTION

PATENT NO. : 9,332,546 B2  
APPLICATION NO. : 14/141743  
DATED : May 3, 2016  
INVENTOR(S) : Zhou et al.

Page 1 of 1

It is certified that error appears in the above-identified patent and that said Letters Patent is hereby corrected as shown below:

Title page, the following item should be included:

Related U.S. Application Data

(63) Continuation of application No. PCT/CN2012/072884, filed March 23, 2012.

Signed and Sealed this
Nineteenth Day of July, 2016

Michelle K. Lee
*Director of the United States Patent and Trademark Office*